United States Patent [19]

Benedict

[11] Patent Number: 5,390,508
[45] Date of Patent: Feb. 21, 1995

[54] APPARATUS FOR AIR CONDITIONING A VEHICLE, IN PARTICULAR AN ELECTRIC VEHICLE

[75] Inventor: Olusegun O. Benedict, Les Ulis, France

[73] Assignee: Valeo Thermique Habitacle, Le Mesnil Saint Denis, France

[21] Appl. No.: 142,270

[22] Filed: Oct. 25, 1993

[30] Foreign Application Priority Data

Oct. 26, 1992 [FR] France ............... 92 12740

[51] Int. Cl.6 .................................. F25B 29/00
[52] U.S. Cl. ........................ 62/325; 62/117; 62/324.6
[58] Field of Search ........... 62/117, 324.6, 325, 62/89

[56] References Cited

U.S. PATENT DOCUMENTS

| | | | |
|---|---|---|---|
| 2,806,358 | 9/1957 | Jacobs | 62/244 |
| 3,719,058 | 3/1973 | Waygood | 62/200 |
| 4,991,405 | 2/1991 | Sakano | 62/244 |
| 5,211,023 | 5/1993 | Matsuura | 62/117 |

FOREIGN PATENT DOCUMENTS

| | | |
|---|---|---|
| 0356716 | 3/1990 | European Pat. Off. . |
| 0473286 | 4/1992 | European Pat. Off. . |
| 0484548 | 5/1992 | European Pat. Off. . |
| WO9216389 | 1/1992 | Germany . |
| 0082241 | 6/1980 | Japan . |
| 57-178913 | 4/1982 | Japan . |

*Primary Examiner*—William E. Wayner
*Attorney, Agent, or Firm*—Morgan & Finnegan

[57] ABSTRACT

The device comprises two condenser/evaporator pairs, belonging to a single refrigerant circuit, which may be selectively brought into operation and disposed at appropriate points on an air circuit having a variable configuration, the first pair being brought into operation in summer so that the evaporator cools a flow of air to be returned into the passenger space, and the second pair being brought into operation in winter so that the condenser heats a flow of air to be conveyed into the passenger space.

6 Claims, 2 Drawing Sheets

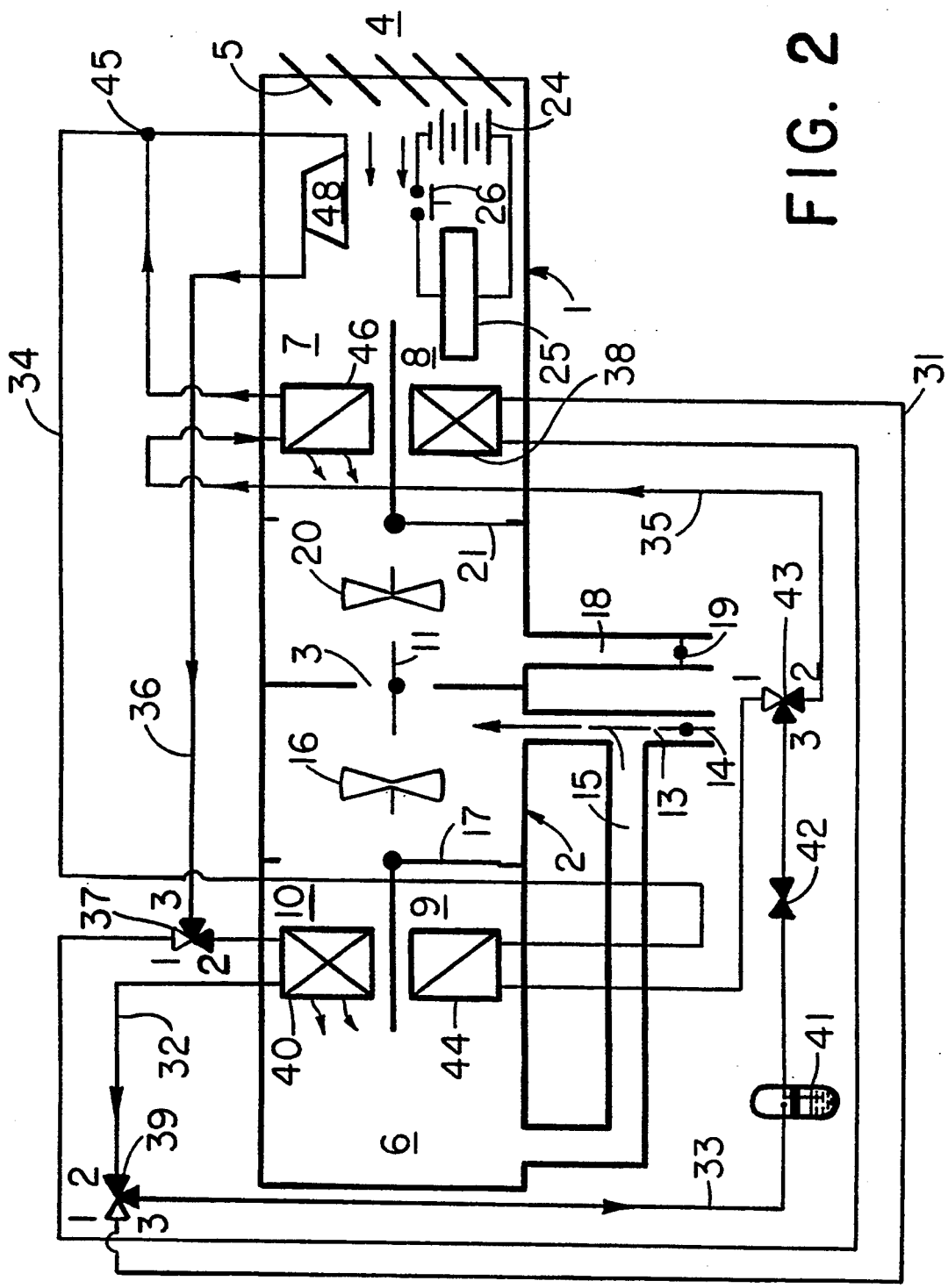

APPARATUS FOR AIR CONDITIONING A VEHICLE, IN PARTICULAR AN ELECTRIC VEHICLE

FIELD OF THE INVENTION

The invention relates to method and apparatus for air conditioning vehicles, in particular electric vehicles.

BACKGROUND OF THE INVENTION

A known process for regulating the temperature in the passenger space of a vehicle uses an air conditioning device in which a refrigerant circulates in a univocal manner between an evaporator where it receives heat from a flow of air and a condenser where it yields heat to a flow of air. In this known process, when it is wished to cool a flow of air before it is conveyed into a passenger space, it is brought into contact with the evaporator.

On the other hand, when it is wished to heat a flow of air before conveying it into the passenger space, the heat emitted by the thermal driving engine of the vehicle is normally used for this purpose.

In the case of an electric vehicle, the heat produced by the electrical driving system is not adequate, in winter, to meet the heating requirements of the passenger space. It is therefore necessary to provide an auxiliary source of heat.

The object of the invention is to utilize, for the heating of the passenger space, the existing air conditioning appliance, without altering the direction of circulation of the refrigerant.

DISCUSSION OF THE INVENTION

The invention relates in particular to a process for regulating the temperature in the passenger space of a vehicle by using an air conditioning device in which a refrigerant circulates in a univocal manner between at least one evaporator where it receives heat from a flow of air and at least one condenser where it yields heat to a flow of air, in which process, when it is wished to cool a flow of air before conveying it into the passenger space, the refrigerant is circulated between a first evaporator and a first condenser and the said flow of air is brought into contact with the first evaporator; characterised in that, when it is wished to heat a flow of air before conveying it into the passenger space, the refrigerant is circulated between a second evaporator and a second condenser and said flow of air to be heated is brought into contact with the second condenser.

The use of different evaporators and different condensers for cooling and for heating enables on the one hand each of these components to be dimensioned according to the maximum useful output required for its respective function, and on the other hand enables each of them to be disposed at the optimal site in the circuit of air.

The second evaporator may in particular be mounted in parallel with the first evaporator and the second condenser in parallel with the first condenser in a same refrigerant circuit, means being provided to bring selectively one or the other of the two evaporators and one or the other of the two condensers into operation.

The operating means may comprise at least two three-way valves, one capable of selectively connecting the first evaporator or the second evaporator, and the other capable of selectively connecting the first condenser or the second condenser, with components common to the said circuit, such as a compressor and an expansion valve.

The invention also comprehends apparatus for operating the process defined above, comprising an air circuit having a first section containing the components to be cooled of the vehicle, subdivided over a fraction of its length into a first branch and a second branch mutually disposed in parallel and containing respectively the first condenser and the second evaporator, and a second section disposed downstream from the first section, subdivided over a fraction of its length into a third branch and a fourth branch disposed mutually in parallel, the third branch containing the second condenser; means for generating a first flow of air in the first section, means for generating a second flow of air in the second section, selective shut-off means operable to allow or prevent the circulation of said flows of air in each of the first, second, third and fourth said branches, a controlled choke flap operable to interrupt the communication between the first and second sections, an air external air outlet at the upstream end of the first section, an air outlet to the exterior at the downstream end of the first section, an external air inlet and a recirculation air inlet at the upstream end of the second section, equipped with means for regularing the proportions of external air and recirculation air, and an air outlet to the passenger space at the downstream end of the second section.

Other characteristics, be they complementary or alternative, of the apparatus according to the invention are as follows:
- an auxiliary heating source equipped with control means may be disposed in the first section;
- the components to be cooled can comprise a power supply battery for an electric motor powering the vehicle and/or a compressor for the refrigerant;
- the apparatus may incorporate coordinated control means capable of acting on the selective shut-off means and on the means for bringing into operation the evaporators and the condensers so that each evaporator and each condenser is in operation when a flow of air circulates in the branch of the air circuit in which it is located and not in operation when no flow of air circulates in said branch;
- the coordinated control means may be capable of establishing a first configuration of the apparatus in which the first evaporator and the first condenser are in operation, the second evaporator and the second condenser are not in operation and the controlled choke flap interrupts the communication between the first and second sections, and a second configuration in which the second evaporator and the second condenser are in operation, the first evaporator and the first condenser are not in operation and the controlled choke flap opens the communication between the first and second sections.

Other characteristics and advantages of the invention will become apparent by studying the following detailed description, and the attached drawings, given by way of example only.

BRIEF DESCRIPTION OF THE DRAWINGS

FIGS. 1 and 2 are similar dragrammatic representations illustrating electric vehicle air conditioning apparatus according to the invention in two configurations corresponding to summer operation and winter operation respectively.

DETAILED DESCRIPTION OF THE PREFERRED EMBODIMENT

Figure 1:
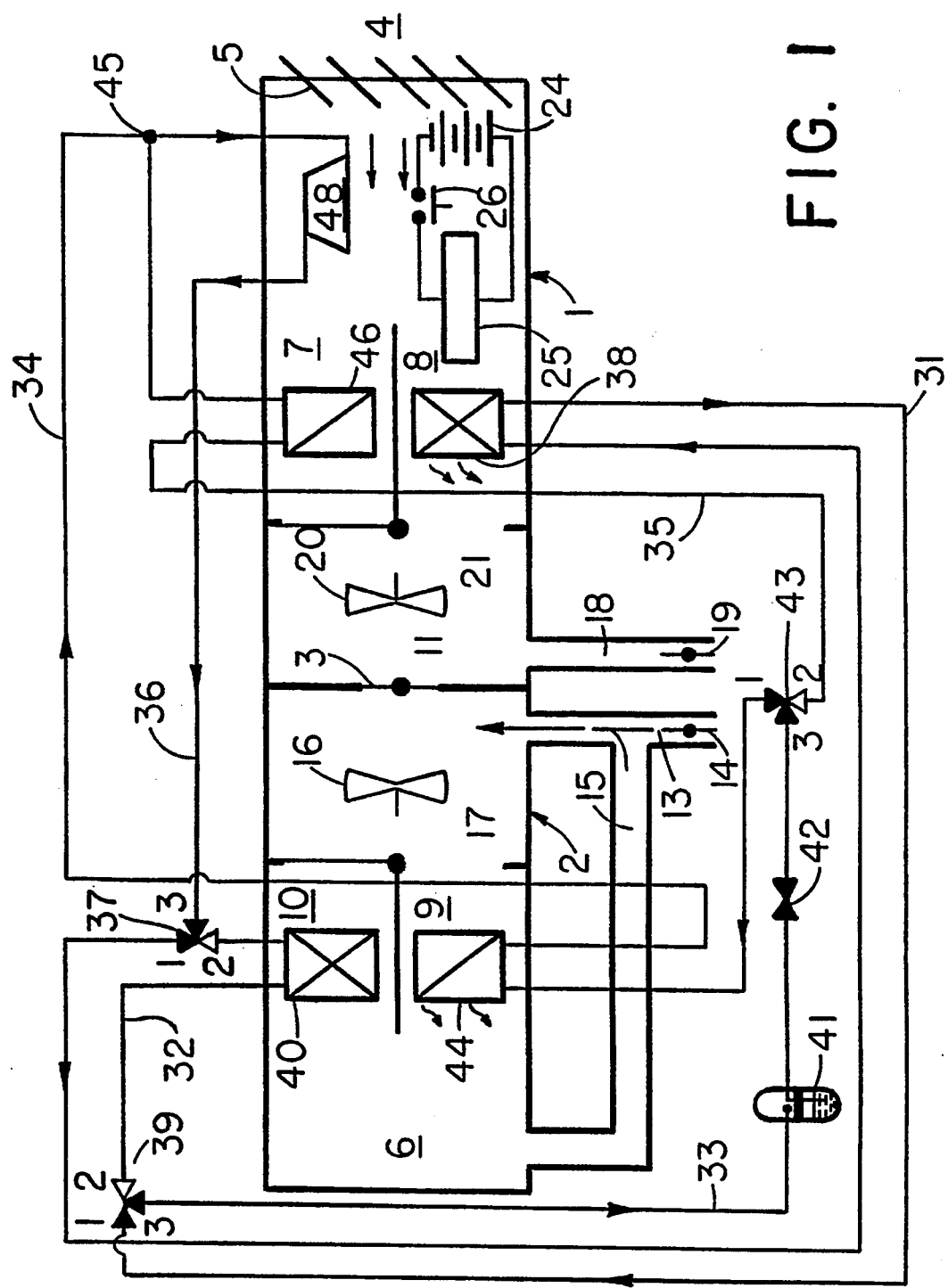

The apparatus illustrated, intended for the air conditioning of an electrically powered motor vehicle, comprises an air conditioning air circuit essentially comprising two sections 1 and 2 connected in series by means of a communication aperture 3 which may be closed by a throttle valve 11. The upstream end, with respect to the circulating direction of the air, of section 1 communicates with the exterior of the vehicle by an aperture 4 equipped with a shutter 5 shown in the form of a flap having multiple pivoting blades, and the downstream end of the section 2 communicates with the passenger space 6 of the vehicle.

Section 1 is sub-divided, over a part of its length, into a first branch 7 and a second branch 8. Similarly, section 2 is subdivided over part of its length into a third branch 9 and a fourth branch 10. Upstream from branches 9 and 10, section 2 communicates with an external air inlet 13 equipped with a variable throttle 14 and with an inlet 15 for recirculation air coming from the passenger space, and contains an electric fan unit 16. A movable flap 17 enables the flow of air produced by the electric fan unit 16 to circulate as selected in branch 9 or in branch 10. Similarly section 1, downsteam from branches 7 and 8, communicates with an air outlet 18 towards the outside, provided with variable throttle 19, and contains a electric fan unit 20. A movable flap 21 enables the flow of air produced by the electric fan unit 20 to circulate as selected in branch 7 or in branch 8. Section 1, upstream from branches 7 and 8, contains the driving battery 24 of the vehicle, as well as an auxiliary heating resistor 25 which can be powered by the battery 24 via a switch 26.

The apparatus also comprises a refrigerant circuit principally comprising six branches 31 to 36 connecting, two by two, three three-way solenoid valves 37, 39 and 43, each of which has its three paths marked by three number 1, 2, and 3, and a fourth connection point at T 45. Branch 31, in which the fluid may circulate from path 1 of the solenoid valve 37 to path 1 of the solenoid valve 39, contains a first condenser 38, disposed in branch 8 of the air circuit. Branch 32, which goes from path 2 of solenoid valve 37 to path 2 of solenoid valve 39, contains a second condenser 40 which is placed in branch 10 of the air circuit. In branch 33, which goes from path 3 of the solenoid valve 39 to path 3 of the solenoid valve 43, are mounted a cylinder/dehumidifier 41 and an expansion valve 42. From path 1 of solenoid valve 43 to point 45, the refrigerant may circulate in branch 34 via a first evaporator 44, disposed in branch 9 of the air circuit, and in branch 35, which goes from path 2 of solenoid valve 43 to point 45, via a second evaporator 46 disposed in branch 7 of the air circuit. Finally, the fluid returns from point 45 to path 3 of solenoid valve 37 by branch 36, via a compressor 48 placed in section 1 of the air circuit, upstream from branches 7 and 8. Branches 31, 33, 34 and 36 form a conventional air conditioning circuit, to which are added, according to the invention, branches 32 and 35 in parallel respectively with branches 31 and 34.

FIG. 1 shows the configuration of the air circuit for the operation of the apparatus in summer. In this Figure, the apertures 4, 13 and 18 are freed by the corresponding choke flaps, and the aperture 3 between sections 1 and 2 is blocked. The flap 17 blocks the upstream end of branch 7. Furthermore, passages 1–3 of solenoid valves 37, 39 and 43. The fluid therefore circulates in the condenser 38 and in the evaporator 46. Outer air penetrating through inlet 13, entrained by the electric fan unit 16, circulates in the upstream region of section 2 and in branch 9, where it is cooled on contact with the evaporator 44, before arriving in the passenger space. Furthermore, the electric fan unit 20 sucks in a flow of air from inlet 4 which is heated by the battery 24 and by the compressor 48 and arrives in branch 8, where it is charged with the heat emitted by the condenser 38, in order to evacuate it towards the outside through outlet 18. Of course, switch 26 is open and the resistor 25 is not in use.

Instead of being completely open as shown, the throttle 14 may be partially or totally closed, so that the air penetrating into branch 9 and conveyed into the passenger space is partially or totally recirculated air.

FIG. 2 represents the configuration of the air circuit from a moderate heating of the passenger space, in particular when the external temperature is still above a limit value of 5° to 7° C. The apertures 3, 4 and 13 are open and aperture 18 is blocked. The flaps 17 and 21 block the branches 9 and 8 respectively. The passages 2–3 of the solenoid valves of the refrigerant circuit are open, so that the evaporator 46 and the condenser 38 are in use. The switch 26 is still open.

The flow of air aspirated by the electric fan unit 20 and penetrating through aperture 4, and heated by the battery 24 and the compressor 48, passes into branch 7 where it yields to the evaporator 46 a quantity of heat enabling the operation of the refrigerant circuit. This flow of air is transmitted through aperture 3 into section 2 where there is added a supplementary flow produced by the electric fan unit 16 through apertures 13 and 15. The resultant total flow passes into branch 10 where it receives heat from the condenser 4, then passes into the passenger space 6.

In the event of more intense cold, a complementary source of heat may be provided by the resistor 25, by closing the switch 26.

As in the first configuration described, the proportion of air recirculated admitted at the downstream end of section 2 may be increased to 100% by progressively closing the throttle 14.

What is claimed is:

1. Apparatus for regulating the temperature in the passenger space of a motor vehicle comprising an air circuit having a first section subdivided over a fraction of its length into a first branch and a second branch disposed mutually in parallel and containing respectively a first condenser and a first evaporator, and a second section located downstream of the first section, subdivided over a fraction of its length into a third branch and a fourth branch disposed mutually in parallel, the third branch containing a second evaporator and the fourth branch containing a second condenser, means for circulating a refrigerant between Said first evaporator and said first condenser and between said second evaporator and said second condenser, means for producing a first flow of air in the first section, means for producing a second flow of air in the second section, selective shut-off means capable of allowing or preventing the circulation of said flows of air in each of the first, second, third and fourth branch, a controlled choke flap capable of interrupting communication between the first and second sections, an external air inlet at the upstream end of the first section, an air outlet to the exterior of the motor vehicle disposed adjacent the downstream end of the first section, a second external air inlet and a recirculation air inlet disposed adjacent the upstream end of the second section having means for regulating the proportions of external air and air in recirculation, and an air outlet to the passenger space disposed adjacent the downstream end of the second section.

2. Apparatus according to claim 1, wherein an auxiliary heating source equipped with control means is disposed in the first section.

3. Apparatus according to claim 1, wherein said first section includes a power supply battery for an electric engine for powering the vehicle.

4. Apparatus according to claim 4, further comprising coordinated control means in communication with the selective shut-off means and the evaporators and condensers such that each evaporator and each condenser is in operation with a flow of air circulates in the branch of the circuit of air which each said evaporator and condenser is located and is not in operation when no flow of air circulates in said branch.

5. Apparatus according to claim 4, wherein the coordinated control means are operable to establish a first configuration in which the second evaporator and the first condenser are in operation, the first evaporator and the second condenser are not in operation and said controlled choke flap interrupts the communication between the first and second sections, and a second configuration in which the first evaporator and the second condenser are in operation, the second evaporator and the first condenser are not in operation and the controlled choke flap opens the communication between the first and second sections.

6. Apparatus according to claim 1, wherein said first section includes a compressor for the refrigerant.

* * * * *